United States Patent [19]

Kudo

[11] Patent Number: 4,606,044
[45] Date of Patent: Aug. 12, 1986

[54] ADJUSTING DATA TRANSMISSION RATE BASED ON RECEIVED SIGNAL QUALITY

[75] Inventor: Shozo Kudo, Yokohama, Japan

[73] Assignee: Ricoh Company, Ltd., Tokyo, Japan

[21] Appl. No.: 586,509

[22] Filed: Mar. 5, 1984

[30] Foreign Application Priority Data

Mar. 9, 1983 [JP] Japan .................................. 58-37274

[51] Int. Cl.[4] .............................................. H04J 3/22
[52] U.S. Cl. .......................................... 375/13; 375/58; 370/84
[58] Field of Search ................... 375/13, 58, 109, 121; 371/5; 370/79, 84; 178/69 A, 69 M

[56] References Cited

U.S. PATENT DOCUMENTS 3,536,840 10/1970 Sullivan ................................. 375/58
3,988,539 10/1976 Motley et al. ......................... 375/39
4,153,916 5/1979 Miwa et al. .......................... 358/288

FOREIGN PATENT DOCUMENTS 0039191 11/1981 European Pat. Off. ................ 371/5

Primary Examiner—Benedict V. Safourek
Assistant Examiner—Raymond C. Glenny
Attorney, Agent, or Firm—David G. Alexander

[57] ABSTRACT

A data transmission control system for allowing remote transceiver stations to transmit data via a telephone line or like analog transmission line through modems. When transmit and receive stations have been interconnected by a call, a training sequence for the modem is executed and, also, a test signal transmission sequence is effected to set up a data transmission rate before delivery of information. When the receive station has received test training data inclusive of a plurality of transmission rates from the transmit station, the function of the modem at the receive station is checked with respect to each of the transmission rates on a signal space diagram, thereby determining whether the receive station is capable of normally receiving data at the transmission rate. Training on the transmission rates which a modem can use is executed satisfying a predetermined protocol and without increasing the protocol time.

9 Claims, 11 Drawing Figures

Fig. 5A
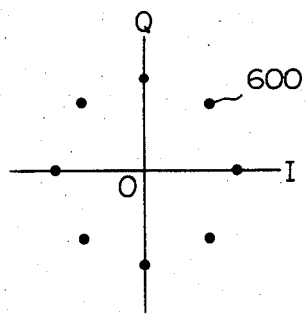
Fig. 5B    Fig. 5C    Fig. 5D
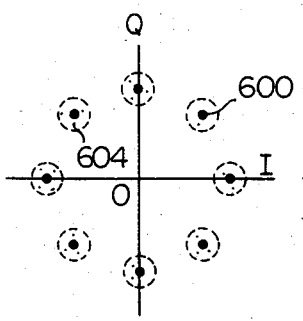 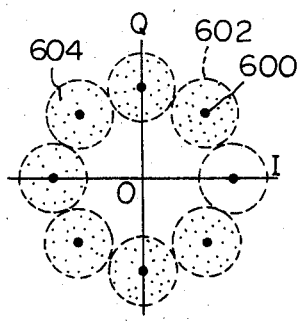 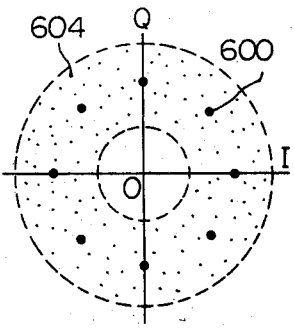

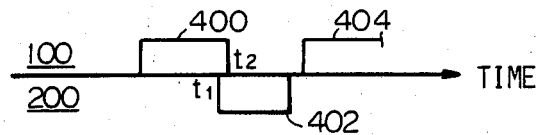
Fig. 6A
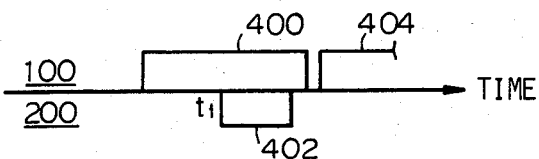
Fig. 6B
Fig. 7
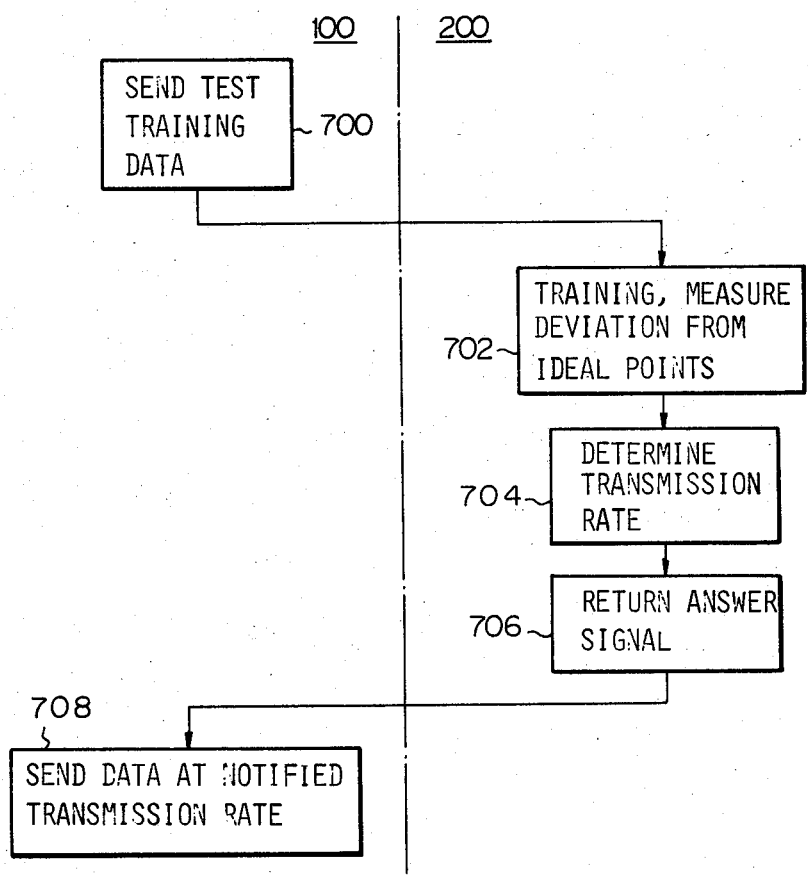

ADJUSTING DATA TRANSMISSION RATE BASED ON RECEIVED SIGNAL QUALITY

BACKGROUND OF THE INVENTION

The present invention relates to a data transmission control system and, more particularly, to a data transmission control system which allows remote transceiver stations to exchange images, digital data and like signals over an analog transmission line using modems.

In data transmission using an analog transmission line such as a telephone line, it is a common practice to execute a training sequence for a modem when connection has been set up between remote transceiver stations by a call. As soon as various parameters are converged by the training, a test signal transmission sequence is performed before the transmission of information in order to predetermine a data transmission rate. For example, in accordance with the facsimile transmission control procedure presented by the Consultive Committee of International Telegraph and Telephone (CCITT), Recommendation T.30, training for a modem of the group 3 (G3) is confirmed and, then, a training check field (TCF) is defined as a test signal for setting up a data transmission rate. The TCF consists of a signal in which ZEROs sequentially appear for the duration of 1.5 seconds. The receiving station, receiving the TCF and when found many transmission errors, requests the transmitting station to shift down the data transmission rate.

As stated in the Recommendation T.30, if a modem at the receiving station fails to adapt itself to test data which is delivered thereto from the transmitting station for 1.5 seconds at the transmission rate of 9,600 bits per second (bps), for example, the receiving station notifies it to the transmitting station while the transmitting station responds to the notification by shifting down the transmission rate to 7,200 bps and then repeating the same test sequence. If the modem at the receiving station is failed to such a degree as to require further shift-down from 4,800 bps to 2,400 bps, 6 seconds will be consumed in total for the delivery of test data alone. The resulting increase in the total protocol time is undesirable because it lowers the data transmission efficiency of the whole system.

Meanwhile, a communication control system is known in which test data is sequentially delivered from a transmitting station to a receiving station at all the transmission rates which a modem can accommodate, the delivery being repeated until the receiving station completes equalization (Japanese Patent Laid-Open Publication Nos. 52-94715/1977 and 52-94716/1977). Such a system is not fully acceptable, however, considering a possible occurrence that, even after equalization has been completed at a given transmission rate, test data of lower transmission rates are sent out, increasing the total protocol time.

SUMMARY OF THE INVENTION

It is therefore an object of the present invention to provide a data transmission control system which eliminates the drawbacks inherent in the prior art systems as described above and executes a training with transmission rates which a modem can utilize, without prolonging the protocol time.

It is another object of the present invention to provide a data transmission control system which satisfies a predetermined protocol and, without increasing the protocol time, executes a training with transmission rates which a modem can accommodate.

It is another object of the present invention to provide a generally improved data transmission control system.

A data transmission control system for allowing remote transceiver stations to transmit data via an analog transmission line through modems which selectively use a plurality of transmission rates of the present invention comprises the steps of transmitting test training data inclusive of a plurality of transmission rate data from a transmit station to a receive station, training a modem of said receive station when said test training data are received by the receive station, selecting a transmission rate adequate for communication between the transmit and receive stations by measuring deviation of the test training data received by the receive station from ideal data points on a signal space diagram, notifying said selected transmission rate from the receive station to the transmit station, and transmitting data from the transmit station at said notified transmission rate.

The term "data" used in the instant specification should be understood to include not only the digital data used for digital computers but also the signals prepared by coding audio signals, video signals and like analog signals.

The above and other objects, features and advantages of the present invention will become more apparent from the following detailed description taken with the accompanying drawing.

BRIEF DESCRIPTION OF THE DRAWING

FIGS. 5A–5D are exemplary signal space diagrams indicative of data signals which are provided by 8-phase modulation;

FIGS. 6A and 6B are flowcharts demonstrating a modification to the transmission control flow in accordance with the present invention; and FIG. 7 is a flowchart showing control flows performed at transmit and receive stations.

DESCRIPTION OF THE PREFERRED EMBODIMENT

While the data transmission control system of the present invention is susceptible of numerous physical embodiments, depending upon the environment and requirements of use, a substantial number of the herein shown and described embodiment have been made, tested and used, and all have performed in an eminently satisfactory manner.

Figure 1:
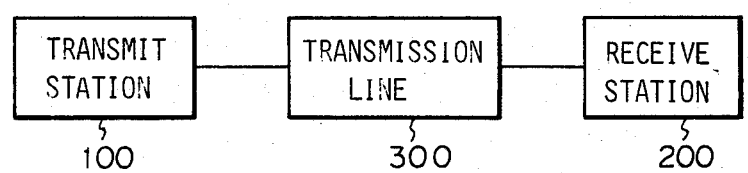
FIG. 1 is a block diagram of a communication system to which a data transmission control system of the present invention is applicable.
Figure 2:
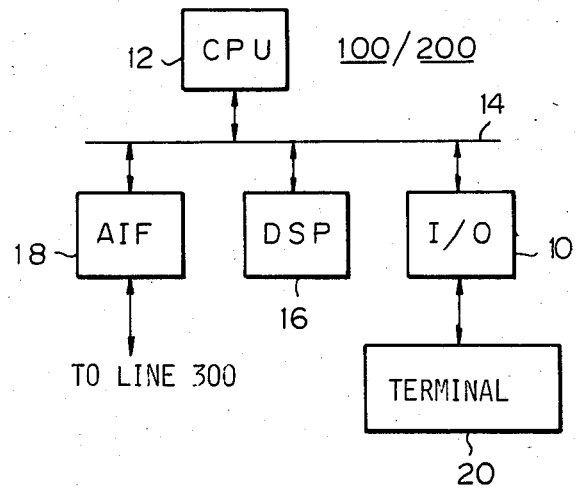
FIG. 2 is a functional block diagram of a transmit station or a receive station implementing the data transmission control system of the present invention.

Referring to FIGS. 1 and 2, a transmitting transceiver station 100 and a receiving transceiver station 200 are interconnected by a transmission line 300. The transmit station 100 or receive station 200 includes a facsimile or like terminal 20. Coded data is applied from the terminal 20 to an input/output (I/O) port 10 and vice versa. A system control processor (CPU) 12 supervises transmission controls and communication controls over the entire transceiver station inclusive of the terminal 20. Preferably, the system control processor 12 comprises a digital processor.

The transmission line 300 is such an analog transmission line as a telephone line and may be in any desired configuration such as a public network, a private network, a switching network or a leased circuit.

Essential portions of the transceiver station 100 or 200 are shown in FIG. 2. As shown, the station 100 or 200 includes a bus 14 to which are connected the CPU 12, I/O port 10, a digital signal processor (DSP) 16, and an analog interface circuit (AIF) 18. The analog interface circuit 18 accommodates the transmission line 300 to serve as an interface between the station 100 or 200 and the line 300, while performing conversion between an analog signal on the line 300 and a digital signal in the station 100 or 200.

Constituting a central device of the illustrated system, the digital signal processor 16 is a processing device which implements, by means of digital signal processings, various functions necessary for a modem which include carrier detection, timing extraction, automatic gain control and automatic adaptive equalization.

Where the terminal 20 comprises a facsimile transceiver, for example, the CPU 12 in accordance with this embodiment performs a transmission control in the non-standard mode which is defined in the CCITT Recommendation T.30.

Figure 3:
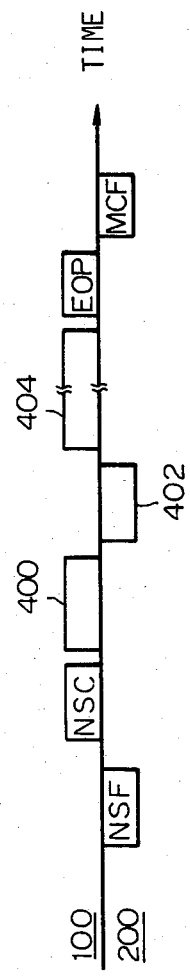
FIGS. 3 and 4 are flowcharts representing a transmission control flow in accordance with the present invention.

Referring to FIG. 3, connection is set up between the transmit station 100 and the receive station 200 by a call, for example. In the case of non-standard facilities, when an NSF (non-standard facility) signal is returned from the receive station 200 to the transmit station 100, the CPU 12 at the transmit station 100 sends out test training data 400 to the receive station 200 after an NSC (non-standard facility command) signal by means of the DSP 16 (FIG. 7, step 700).

Figure 4:
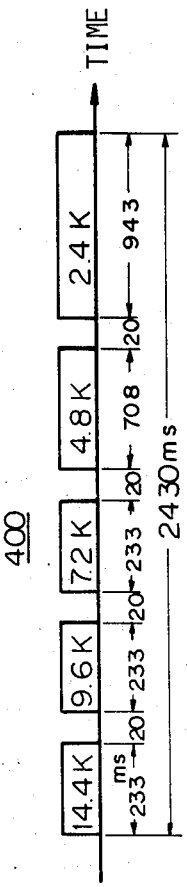

As shown in FIG. 4, the test training data in the illustrative embodiment is transmitted at four different transmission rates, 14.4 Kbps, 9.6 Kbps, 7.2 Kbps, 4.8 Kbps and 2.4 Kbps. Shifting down the transmission rate in this manner is desirable from the efficiency standpoint.

Concerning the transmission rate of 9.6 Kbps, for example, the symbols of segments 2, 3 and 4 prescibed by the CCITT Recommendation V.29 will be sent out, total tansmission time amounting to 233 milliseconds (ms). The same applies to the transmission rate of 7.2 Kbps and, in this particular embodiment, also applies to the transmission rate of 14.4 Kbps although no such recommendation is present for the latter transmission rate. As for the transmission rates of 4.8 Kbps and 2.4 Kbps, the symbols of segments 3, 4 and 5 prescribed by the CCITT Recommendation V.27 will be sent out and the total times consumed thereby are 708 ms and 943 ms respectivley. In the illustrative embodiment, the carrier is interrupted for a given period of time, e.g. on the order of 20 ms, between adjacent test data representative of different transmission rates in order to show a change in the transmission rate. In total, therefore, the test training data 400 are transmitted over a period of 2,430 ms.

At the receive station 200, the DSP 16 causes various functions, as those of a modem, to converge using the test training data 400. At this instant, the DSP 16 checks the functioning state, as that of a modem, for each of the transmission rates by use of a signal space diagram, thereby determining whether or not normal receipt is possible at the transmission rate (FIG. 7, step 702).

In detail, the DSP 16 at the receive station 200 measures signal space vectors of the test training data 400 and, in response to the result of the measurement, notifies the transmit station an adequate transmission rate (FIG. 7, steps 704 and 706).

Concerning an 8-phase phase modulation system, for example, the signal space diagram of a signal sent out from the transmit station 100 to the transmission line 300 comprises eight points (ideal points) 600 as shown in FIG. 5A, which are identical in phase difference ($\pi/4$) and spaced equal distances from the origin O of a real axis (I) and an imaginary axis (Q).

While propagating through the transmission line 300 toward the receive station 200, the signal is subjected to various kinds of phase delay and attenuation. As shown in FIG. 5B or 5C, so long as data points 604 of signal space vectors are distributed relatively adjacent to the ideal points 600 of the transmitted signal vectors in a signal space, information symbols contained in the received signal will be identified with ease. However, where the data point distribution extends over a substantial range beyond the ideal points 600 as show in FIG. 5D, for example, accurate identification of the information symbols will fail. The critical condition for accurate identification is, as shown in FIG. 5C, one in which the data points 604 of the received signal vectors lie within eight circles 602 which respectively are concentric with the eight ideal points 600 and in contact with each other.

Once the critical condition such as shown in FIG. 5C is reached wherein the border between adjacent data points is identifiable to a certain extent, various parameters of the modem at the receive station 200 progressively converge with the lapse of time due to the automatic adaptive equalization function. This often results in the condition shown in FIG. 5B, in which data will be successfully received.

At the receiver 200, the DSP 16 manages such space signal vectors of the received signal to see deviations, or displacements, of the data points 604 from the ideal points 600. That is, the DSP 16 measures the distances between the respective data points 604 of the received test training data 400 and the ideal signal points 600 on the signal space diagram, thereby determining whether the received signal was in a bad condition (FIG. 5D) or in a critical condition. Such discrimination between the good condition (FIG. 5B), the critical condition and the bad condition is effected at the DSP 16 by calculating by digital signal processings the distances of the data points 604 of the received signal input from the AIF 18 from the ideal points 600 on the signal space diagram, and then comparing the largest distance with the distance between adjacent ideal points 600. That is, if the deviation from the ideal point 600 is not larger than one half the distance between adjacent ideal points 600, signals will be normally received at the then existing transmission rate.

The CPU 12 at the receive station 200, when identified the normally receivable transmission rate (FIG. 7, step 704), returns an answer signal 402 to the transmit station 100 via the DSP 16 (step 706). The answer signal 402 may be sent out at the transmission rate of 300 bps as advised by the Recommendation T.30 and includes a command indicative of the transmission rate decided by the DSP 16 of the receive station 200. At the transmit station 100 received the answer signal 402, the CPU 12 begins a usual sequence for transmitting facsimile data 404 from the facsimile terminal 20 at the commanded trransmission rate (FIG. 7, step 708).

The delivery of the answer signal from the receive station 200 to the transmit station 100 may be effected using a backward channel or a tonal signal. In such a case, it is preferable to use a frequency band other than the occupied bandwidth modems. Then, as shown in FIG. 6A, when the modem at the receive station 200 has been found well conditioned at a time $t_1$, for example, the identified transmission rate is commanded to the transmit station 100 by the receive station 200. In response to this command, the CPU 12 at the transmit station 100 may immediately stop transmitting the test training data 400 and start transmitting facsimile data at the commanded transmission rate. Such a construction serves to shorten the necessary training time.

Another possible arrangement in accordance with the present invention is such that, as shown in FIG. 6B, when the modem at the receive station 200 has been found to be in a good condition at a time $t_1$, for example, and the identified transmission rate is notified from the receive station 200 to the transmit station 100, the CPU 12 at the transmit station 100 continues to send out the remaining part of the test training data 400 while the DSP 16 at the receive station 200, in response to that part of the test training data 400, causes the various modem parameters to converge so as to further reduce the deviation from the ideal signal points, thereby refining the receipt preparation.

In summary, it will be seen that the present invention provides a data transmission control system which is capable of performing, on transmission rates which a modem may utilize, a training sequence within a test time which reconciles itself to a usual test sequence. Therefore, training can be excecuted for the transmission rates usable for a modem which satisfies a predetermined protocol and, yet, entails no increase in the protocol time.

Especially, where the line condition involves frequent shift-downs in transmission rate where use is made of high-speed modems and, therefore, shift-downs are apt to occur, the present invention is successful to effectively shorten the protocol time. In practice, the effect of the present invention will become more prominent with an increase in transmission rate and it is feasible for facsimile communications which uses 14.4 Kbps modems, for example.

Various modifications will become possible for those skilled in the art after receiving the teachings of the present disclosure without departing from the scope thereof.

What is claimed is:

1. A data transmission control method for allowing remote transceiver stations to transmit data via an analog transmission line through modems which selectively use a plurality of transmission rates, said method comprising the steps of:
   (a) transmitting test training data comprised of data bursts in phase modulated form including a plurality of vectors transmitted at a plurality of data rates from a transmit station to a receive station;
   (b) training a modem of said receive station in response to said test training data;
   (c) selecting a transmission rate adequate for communication between the transmit and receive stations by measuring deviation of the vectors of the test training data received by the receive station from ideal predetermined values, said measuring having a degree of accuracy which is sufficient to discriminate among the deviations of test training data vectors which are all closer to the same ideal predetermined value than to any other ideal predetermined value;
   (d) notifying said selected transmission rate from the receive station to the transmit station; and
   (e) transmitting data from the transmit station at said notified transmission rate.

2. A data transmission control method as claimed in claim 1, in which the transmission of the test training data at step (a) is stopped immediately after the notification at step (d).

3. A data transmission control method as claimed in claim 1, in which the transmission of the test training data at step (a) is continued even during the notification.

4. A data transmission control method as claimed in claim 1, in which a transmission rate set up when the deviation at step (c) is not larger than one half a distance between adjacent ideal data points is determined as the adequate transmission rate.

5. A data transmission control method as claimed in claim 1, in which the notification at step (d) is effected by use of a backward channel.

6. A data transmission control method as claimed in claim 1, in which the notification at step (d) is effected by use of a tonal signal.

7. A data transmission control method as claimed in claim 1, in which the analog transmission line is a telephone line.

8. A data transmission control method as claimed in claim 1, in which the test training data include transmission rate data representative of 14.4 Kbps, 9.6 Kbps, 7.2 Kbps, 4.8 Kbps and 2.4 Kbps.

9. A data transmission control method as claimed in claim 8, in which the test training data further include non-transmission periods between the data bursts to separate the data bursts from each other, said non-transmission periods having a predetermined duration.

* * * * *